(No Model.) 4 Sheets—Sheet 2.
J. A. GRIFFITHS.
COMBINED ELECTRIC AND GRAVITY PLEASURE RAILWAY.
No. 572,111. Patented Dec. 1, 1896.
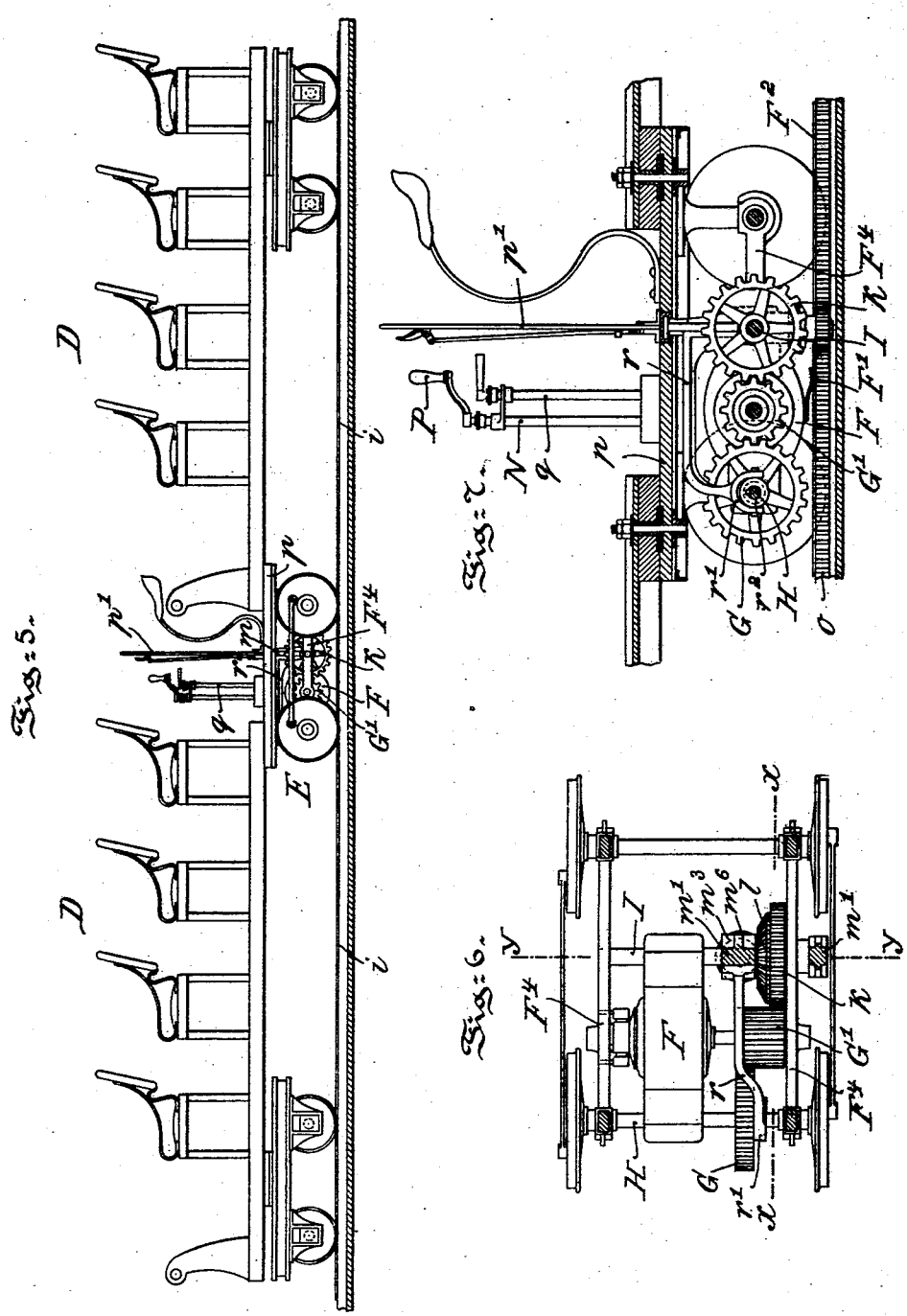
Witnesses:
Thomas M. Smith.
Richard E. Maxwell.
Inventor:
James A. Griffiths,
By J. Walter Douglass
Attorney.

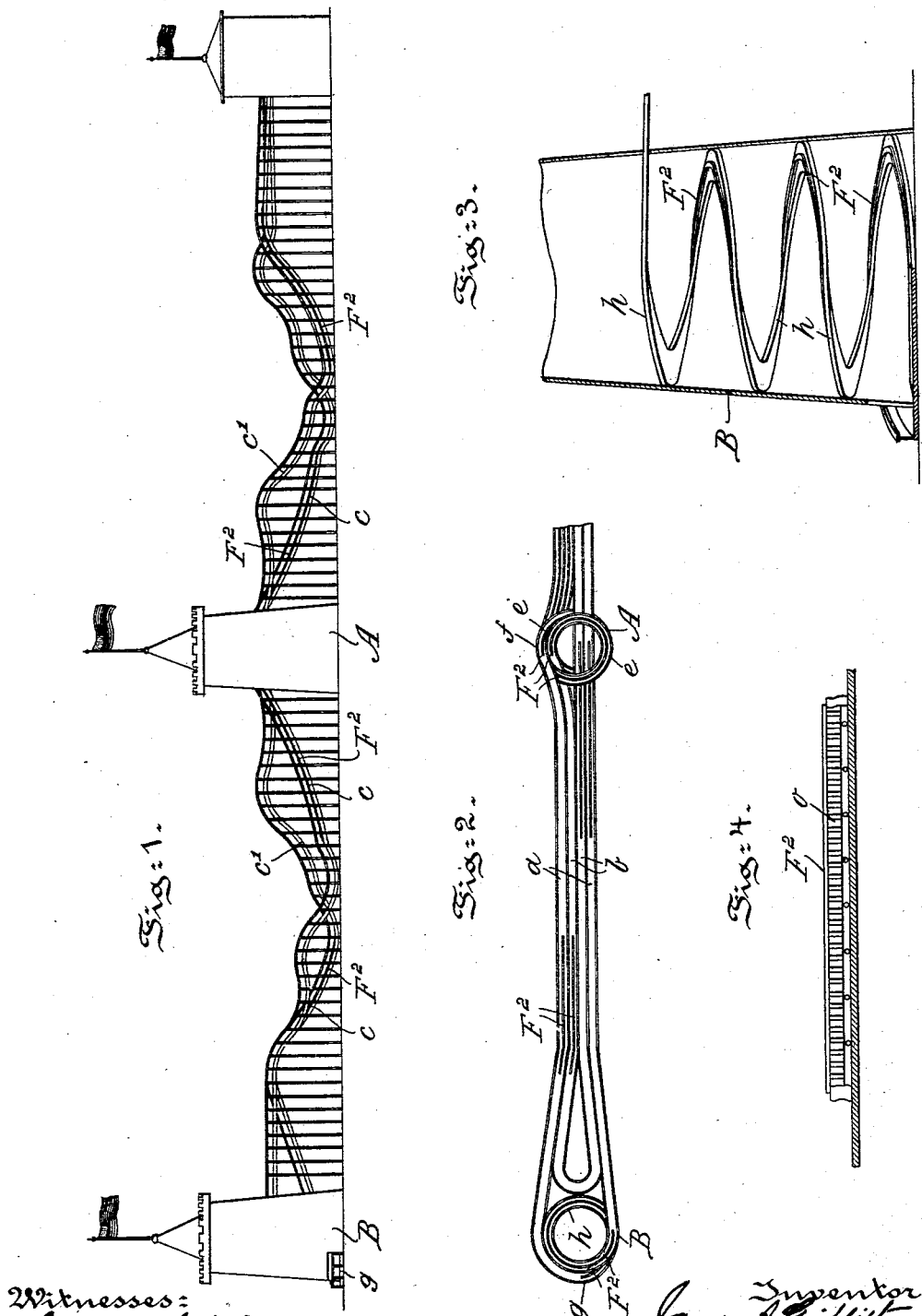

(No Model.) 4 Sheets—Sheet 3.
J. A. GRIFFITHS.
COMBINED ELECTRIC AND GRAVITY PLEASURE RAILWAY.
No. 572,111. Patented Dec. 1, 1896.
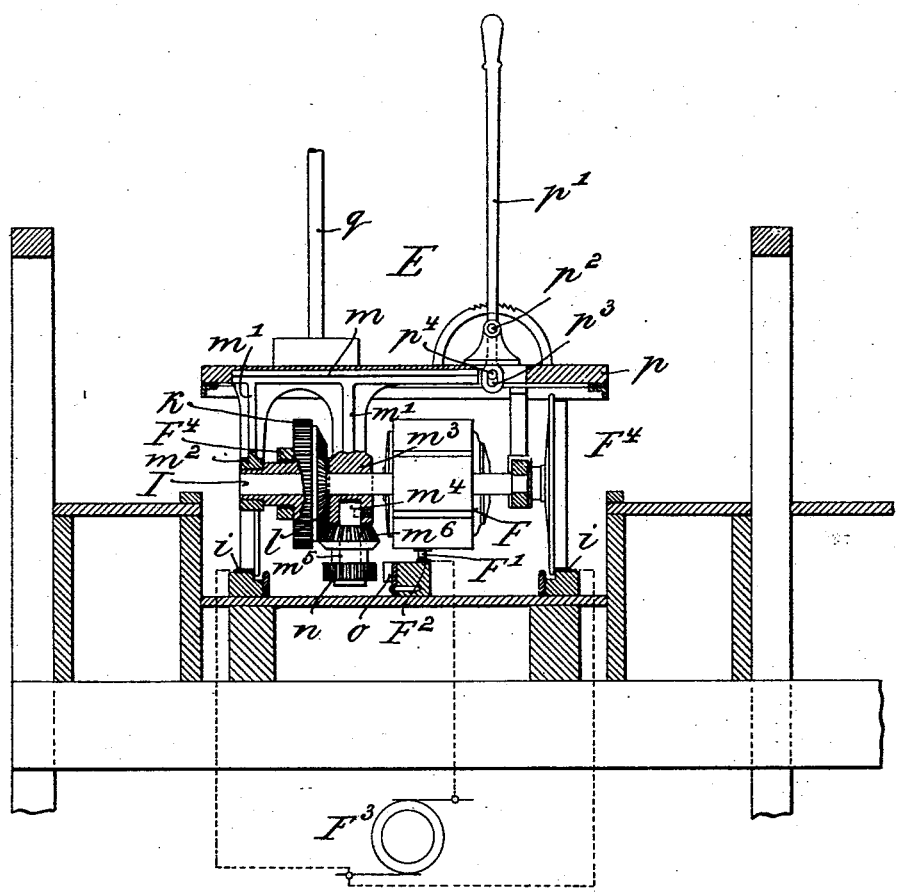
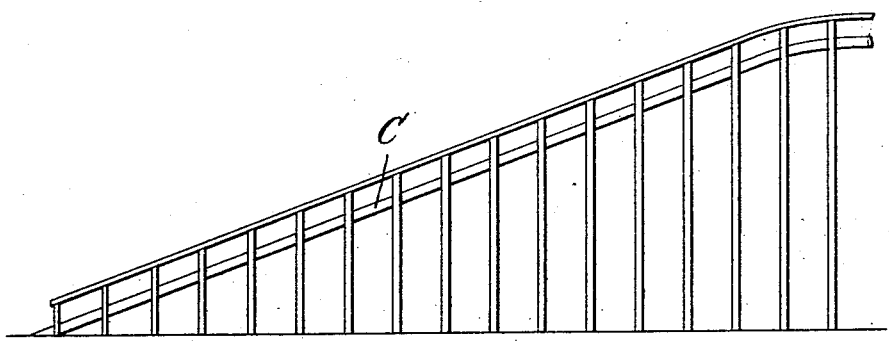
Witnesses:
Thomas M. Smith,
Richard C. Maxwell.
Inventor:
James A. Griffiths,
By J. Walter Douglass.
Attorney.

(No Model.) 4 Sheets—Sheet 4.

J. A. GRIFFITHS.
COMBINED ELECTRIC AND GRAVITY PLEASURE RAILWAY.

No. 572,111. Patented Dec. 1, 1896.

Witnesses:
Thomas M. Smith.
Richard E. Maxwell.

Inventor:
James A. Griffiths,
By J. Walter Douglass
Attorney.

THE NORRIS PETERS CO., PHOTO-LITHO., WASHINGTON, D. C.

UNITED STATES PATENT OFFICE.

JAMES A. GRIFFITHS, OF PHILADELPHIA, PENNSYLVANIA.

COMBINED ELECTRIC AND GRAVITY PLEASURE-RAILWAY.

SPECIFICATION forming part of Letters Patent No. 572,111, dated December 1, 1896.

Application filed April 7, 1896. Serial No. 586,480. (No model.)

*To all whom it may concern:*

Be it known that I, JAMES A. GRIFFITHS, a citizen of the United States, residing at the city of Philadelphia, in the county of Philadelphia and State of Pennsylvania, have invented certain new and useful Improvements in a Combined Electric and Gravity Pleasure-Railway, of which the following is a specification.

My invention has relation to a pleasure-railway for seaside, summer, and other resorts wherein a car or cars are propelled up undulations or inclines by means of electricity and descend downgrades or undulations by means of gravity, and in such connection it relates particularly to the construction and arrangement of the road-bed of said railway and of the motor and mechanism controlled thereby for propelling the car or cars.

The principal objects of my invention are, first, to provide a pleasure-railway wherein the course or courses are undulating or provided with up-and-down grades and inclines, the up grades or inclines only being provided with an electrically-charged feeder-rail and a rack into which the cogged driving-wheel of a motor-car is adapted to mesh to furnish the required power to drive the car up said incline, and, second, to provide in such a pleasure-railway having a rack along its up inclines or grades a motor secured to the truck of a car and adapted normally, through suitable gearing, to drive an axle of said truck, a pinion adapted to be driven by said gearing, and mechanism for shifting said pinion into and out of engagement with said rack.

My invention, stated in general terms, consists of a combined electric and gravity pleasure-railway constructed and arranged in substantially the manner hereinafter described and claimed.

The nature and scope of my invention will be more fully understood from the following description, taken in connection with the accompanying drawings, forming part hereof, and in which—

Figure 10:
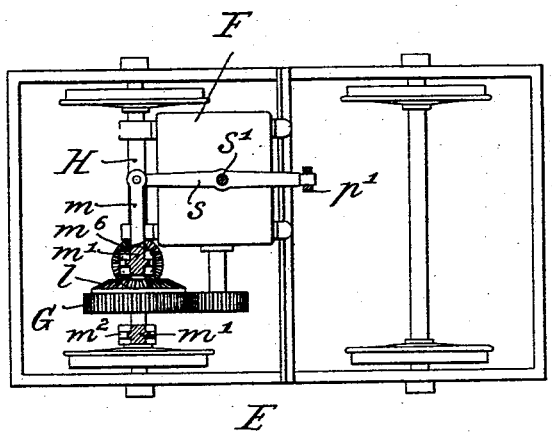
Figure 11:
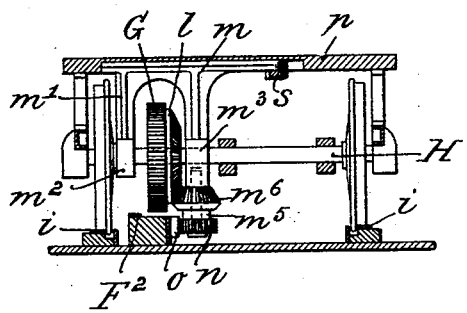
Figure 12:
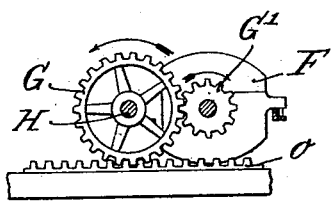

Figure 1 is a side elevational view of a pleasure-railway embodying features of my invention. Fig. 2 is a top or plan view of a portion of said railway. Fig. 3 is a sectional view, enlarged, of the starting-tower and the ascending spiral course located therein. Fig. 4 is a detail, enlarged and in side elevation, of the rack. Fig. 5 is a side elevational view, enlarged, of a motor-car for use upon the pleasure-railway. Fig. 6 is a top or plan view of a preferred form of motor and truck for said car, the platform of the truck being removed. Fig. 7 is a longitudinal section on the line $x$ $x$ of Fig. 6. Fig. 8 is a cross-sectional view, enlarged, taken on the line $y$ $y$ of Fig. 6. Fig. 9 is a side elevation, enlarged, of one of the up grades or inclines of the railway. Figs. 10 and 11 are respectively plan and end elevations of a still further modified form of motor and truck, and Fig. 12 is a detail view illustrating in detail means for driving the car by meshing the driving-cog directly with the rack.

Referring to the drawings, the pleasure-railway consists, by preference, of two concentric outer and inner courses $a$ and $b$, each of which is undulating—that is to say, each is formed into a series of upwardly and downwardly projecting inclines or grades $c$ and $c'$, respectively. The two courses forming the road-bed of the railway are supported upon suitable trestle-work, as illustrated in Fig. 1. The two courses $a$ and $b$ are connected, preferably, in a tower A by means of two upwardly-inclined spiral courses $e$ and $f$, as indicated in plan in Fig. 2. The starting-point of the course is located at $g$, preferably at the base of a tower B, and the course then rises in a spiral $h$ or the incline C of Fig. 9 until approximately the highest point of the course is reached. The arrangement of the courses and connections is such that a car starting from $g$ may return to the same point after traveling continuously in one direction and traversing each course but once.

In the form of course illustrated in the drawings the car is elevated from its starting-point $g$ up the spiral course $h$ in the tower B and is also elevated up the inclines $c$ by means of electricity in the following manner, referring especially to Figs. 4 to 8, inclusive.

The car or cars D are provided with a truck E, upon which is secured a motor F of any preferred type and adapted, when energized, to actuate suitable gear-wheels G and G'. The motor F is provided with a feeder-arm F', adapted to rest upon a feeder-rail F², connected with one pole of a dynamo or other suitable source of electrical energy F³. The rails $i\,i$ of the roadway are likewise connected to the other pole of said dynamo. The gear-wheel G is feathered on the axle H of the truck, so as to have a range of sliding movement thereon. The motor F is supported in the cross bars or frames F⁴ F⁴, which serve also as bearings for the shaft I. On one end of the shaft I is loosely secured a gear-wheel $k$, rotating on said shaft and meshing with the driving-pinion or gear-wheel G', which is actuated by the motor F. To the inner face of this gear-wheel $k$ is secured a miter-gear $l$, substantially as illustrated in Figs. 6 and 8. Upon the shaft I is mounted a sliding frame $m$, the brackets $m'$ of which terminate in boxes $m^2$ and $m^3$, surrounding said shaft. The lower end of the box $m^3$ serves as a support for an arm or shaft $m^4$, on which is loosely mounted a stud $m^5$, carrying a miter-gear $m^6$, meshing with the miter-gear $l$ of gear $k$, and also carrying a horizontally-arranged cog or pinion $n$, adapted to mesh in the rack $o$, formed, preferably, in the side of the feeder-rail F², as illustrated in Figs. 4 and 8.

The frame $m$ is adapted to slide on the under surface of the platform $p$ of the truck, and is operated, preferably, by a hand-lever $p'$, pivoted on the upper surface of said platform, as at $p^2$. The lower end of this hand-lever $p'$ is slotted, as at $p^3$, and in this slot is placed a pin $p^4$, secured to the frame $m$. By shifting the hand-lever $p'$ to the left in Fig. 8 the frame $m$, its boxes $m^2$ and $m^3$, the gear-wheel $k$, and the miter-gears $l$ and $m^6$ are shifted to the right a sufficient distance to bring the cog-wheel $n$ into engagement with the rack $o$. In this position the motor F will, through the gear $k$ and miter-gears, drive the cog $n$, thus propelling the car in a direction opposite to that in which it is to be driven by the gear-wheel G on the axle H. To obviate this difficulty, it is necessary to shift the gear G out of engagement with the driving-pinion G' and to reverse the current sent through the motor. The reversal of the current is readily accomplished by turning the reverser $q$, the construction and arrangement of which are well known.

To shift the gear G out of engagement with the driving-pinion G' of the motor, the following preferred mechanism is used: To the frame $m$ is secured one end of a longitudinally-extending arm $r$, the free end of which is forked, as at $r'$, and is bent downward and pivoted to a stud $r^2$, to which the gear-wheel G is secured, all as clearly illustrated in Figs. 6 and 7. When now the frame $m$ is shifted to the right to bring the cog $n$ in engagement with the rack $o$, the arm $r$ is shifted to the right and through its forked end the gear G is thereby shifted on the axle H, by reason of its feathered connection therewith, out of engagement with the driving-pinion G'.

In Figs. 10 and 11 there is illustrated a modified form of mechanism for propelling the car or cars D up the inclines and spiral courses. In this form the gear-wheel G, feathered to the axle H, carries the miter-gear $l$, which meshes, as before described, with the miter-gear $m^6$, which actuates the cog $n$. The rack $o$ and feeder-rail F² in this form are placed to the left of the cog $n$ instead of to the right, as illustrated in Fig. 8. The frame $m$ is shifted to the left by shifting the hand-lever $p'$ to the right through the intervention of a lever $s$, pivoted, as at $s'$, to the under side of the platform of the truck, and this movement of the frame, through its boxes $m^2$ and $m^3$, shifts the gear-wheel G on the axle H and cog $n$ into engagement with the rack $o$. In this form the motor F, through its driving-pinion G', operates upon the axle H of the truck to directly propel the car thereby, and also acts, through the gear G on said axle and miter-gears $l$ and $m^6$, to operate the cog $n$, which, when in engagement with the rack $o$, serves also to propel the car.

In Fig. 12 a still further modification consists in having the teeth of the gear G, secured to the axle H, mesh directly in the teeth of the rack $o$, which teeth are formed in the top of said rack.

While the car is ascending an incline $c$ or a spiral course $e$, $f$, or $h$ the cog $n$ is shifted into engagement with the rack $o$ and the feeder-arm F' of the motor F rests upon a feeder-rail F². The current is sent through the motor F by means of a controller N, operated through a handle or switch P in the usual manner, and the circuit thus made is from one pole of the dynamo F³, through rails $i\,i$ and wheels and axle H, to the motor F, thence, through a strip or arm F', to the feeder-rail F² and to the other pole of the dynamo.

Having thus described the nature and objects of my invention, what I claim as new, and desire to secure by Letters Patent, is—

1. In a pleasure-railway provided with ascending grades, a rack arranged along said grades, a car provided with a motor, a shaft adapted to be driven by said motor, a driving-pinion connected with said shaft, gearing connecting said pinion with an axle of said car, a frame adapted to shift said pinion on its shaft into and out of engagement with said gearing, and a cog-wheel carried by said frame and meshing with said driving-pinion, said frame adapted to shift said cog-wheel into engagement with said rack when said driving-pinion is out of gear with said axle, substantially as and for the purposes described.

2. In a pleasure-railway provided with ascending grades, a feeder-rail and rack arranged only along the ascending grades, a car provided with suitable trucks, a motor mounted upon one of said trucks, a driving-pinion operated by said motor, a gear-wheel feathered to the axle of said truck and normally meshing with said pinion, a cog-wheel driven by said pinion, and mechanism for simultaneously shifting said cog-wheel into engagement with said rack and said gear-wheel out of engagement with said pinion, substantially as and for the purposes described.

In testimony whereof I have hereunto set my signature in the presence of two subscribing witnesses.

JAMES A. GRIFFITHS.

Witnesses:
 THOMAS M. SMITH,
 RICHARD C. MAXWELL.